United States Patent
Olsen et al.

(10) Patent No.: US 9,137,780 B1
(45) Date of Patent: Sep. 15, 2015

(54) SYNCHRONIZING MULTICAST DATA DISTRIBUTION ON A COMPUTING DEVICE

(75) Inventors: Gregory P. Olsen, Lindon, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 558 days.

(21) Appl. No.: 12/979,987

(22) Filed: Dec. 28, 2010

Related U.S. Application Data

(60) Provisional application No. 61/368,976, filed on Jul. 29, 2010.

(51) Int. Cl.
| | |
|---|---|
| *H04W 72/00* | (2009.01) |
| *G06F 3/06* | (2006.01) |
| *G06F 5/12* | (2006.01) |
| *G06F 5/14* | (2006.01) |
| *G06F 9/445* | (2006.01) |

(52) U.S. Cl.
CPC .............. *H04W 72/005* (2013.01); *G06F 3/06* (2013.01); *G06F 5/12* (2013.01); *G06F 5/14* (2013.01); *G06F 8/61* (2013.01); *G06F 8/65* (2013.01)

(58) Field of Classification Search
None
See application file for complete search history.

(56) References Cited

U.S. PATENT DOCUMENTS

| 6,269,080 | B1 * | 7/2001 | Kumar | 370/236 |
|---|---|---|---|---|
| 2005/0262215 | A1 * | 11/2005 | Kirov et al. | 709/207 |
| 2007/0004415 | A1 * | 1/2007 | Abedi | 455/442 |
| 2007/0106773 | A1 * | 5/2007 | Gallino et al. | 709/223 |
| 2008/0039058 | A1 * | 2/2008 | Ray | 455/414.3 |
| 2008/0046880 | A1 * | 2/2008 | Jun et al. | 717/173 |
| 2008/0294705 | A1 * | 11/2008 | Brauckhoff et al. | 707/205 |
| 2008/0295139 | A1 * | 11/2008 | Aaltonen | 725/87 |
| 2009/0094506 | A1 * | 4/2009 | Lakkis | 714/799 |
| 2009/0125634 | A1 * | 5/2009 | Virdi et al. | 709/231 |
| 2010/0050035 | A1 * | 2/2010 | Hong et al. | 714/748 |
| 2010/0332604 | A1 * | 12/2010 | Mishra et al. | 709/206 |
| 2011/0128976 | A1 * | 6/2011 | Barry et al. | 370/478 |
| 2011/0258301 | A1 * | 10/2011 | McCormick et al. | 709/222 |
| 2012/0327760 | A1 * | 12/2012 | Du et al. | 370/216 |

FOREIGN PATENT DOCUMENTS

| WO | WO 2008/032990 A1 * | 3/2008 | H04L 1/18 |
|---|---|---|---|
| WO | WO 2011/106931 A1 * | 9/2011 | H04L 1/18 |

* cited by examiner

*Primary Examiner* — Ayaz Sheikh
*Assistant Examiner* — Mariela Vidal Carpio
(74) *Attorney, Agent, or Firm* — Austin Rapp & Hardman

(57) ABSTRACT

A computing device that is configured for synchronizing multicast data distribution is described. The computing device includes a processor and instructions stored in memory. The computing device reads a block of data and sends the block of data via multicast. It is determined whether a packet in the block of data requires a new mapped file view. This determination is based on the capacity of a current mapped file view on a target node. The computing device delays sending more data if the new mapped file view is required.

23 Claims, 11 Drawing Sheets

SYNCHRONIZING MULTICAST DATA DISTRIBUTION ON A COMPUTING DEVICE

RELATED APPLICATIONS

This application is related to and claims priority from U.S. Provisional Patent Application Ser. No. 61/368,976, filed Jul. 29, 2010, for "SYNCHRONIZING MULTICAST DATA DISTRIBUTION ON A COMPUTING DEVICE," which is incorporated herein by reference.

TECHNICAL FIELD

The present disclosure relates generally to computers and computer-related technology. More specifically, the present disclosure relates to synchronizing multicast data distribution on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

Certain data may often need to be distributed to many nodes in a network. For example, a new piece of software may need to be distributed to many computers in a network. Sending a large amount of data to many network nodes may occupy a large amount of network bandwidth and processing resources.

As shown from the above discussion, there is a need for systems and methods that will improve the ability to multicast data from a computing device. Improved systems and methods may enable more efficient distribution of data to many nodes on a network.

DETAILED DESCRIPTION

Figure 1:
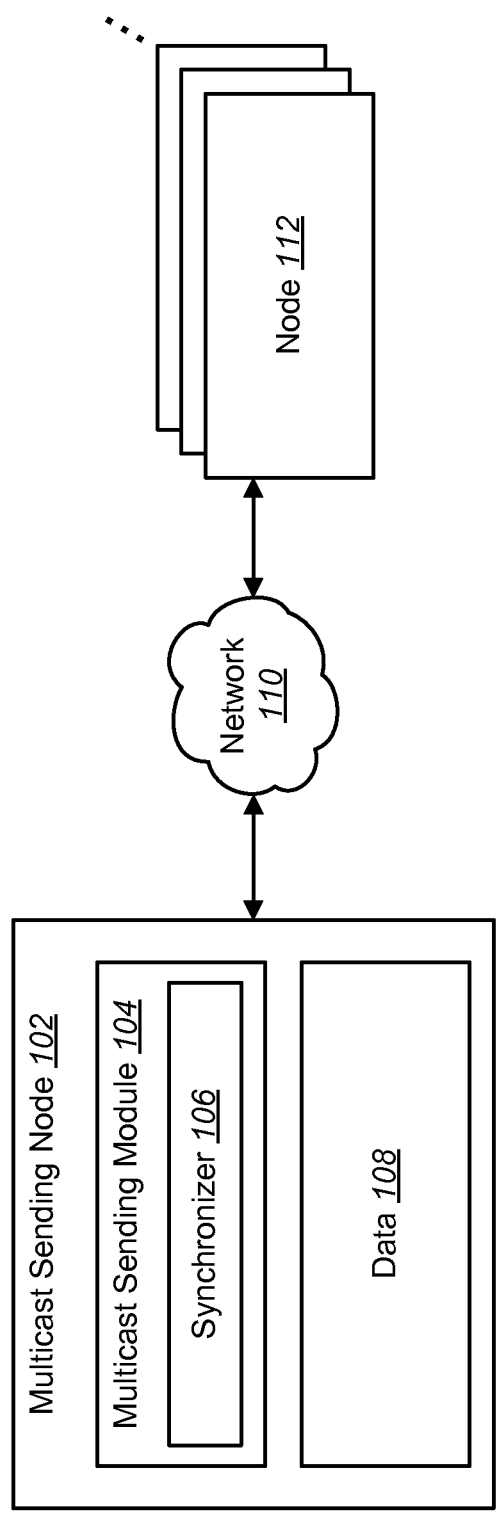
FIG. 1 is a block diagram illustrating one configuration of a system where systems and methods for synchronizing multicast data distribution on a computing device may be implemented.

Multicasting is a communication technique where one source of information or data transmits to two or more recipients at the same time. When used in a computer network, multicasting typically involves one computer sending data to two or more recipient computers over the network. For example, in a single multicasting send operation, a computer may send data once, which may be placed only once on the network. Multiple computers may then receive the data (using the network), even though it was only sent once (in a single multicasting send operation). The computer that sends the data can be referred to as a sending node. The intended recipient computers can be referred to as receiving or "target" nodes.

When a relatively large amount of data is sent to the target nodes, the target nodes may often need to write the received data to a storage device, such as a disk. Writing the received data to a disk can cause the target nodes to "drop" packets that are received during the write period. This may come as a result of high resource consumption during the write operation. Typical multicast solutions that need to write large amounts of the received data to a disk face this problem. Some current multicast solutions attempt to resolve the problem by using complex resend and slowdown logic for the missed packets. This can cause many additional packets to be sent in the process (e.g., retransmit requests and resent packets), which may cause a multicast transmission to be very slow.

It was discovered that the dropping of multicast packets being received was related to the writing of previously received data to disk. During an investigation of why a multicasting configuration was slow, it was found that most multicast packets were lost by target nodes as a result of data being written to disk. In an experiment, a write file function in multicast receiver code was replaced with a simple memory copy. The multicast packets were rarely lost by the receiver in this case. A buffer could be allocated, the data copied and the buffer freed in place of the file write. Using this approach, packets were seldom lost even when the multicast sender sent at full speed.

The systems and methods disclosed herein ameliorate the problem of multicast packets being lost because of writing data (e.g., received in earlier packets) to disk. When fewer packets are lost, the multicast transmission may be faster and more efficient with network resources.

The systems and methods disclosed herein may allow every file write to become a copy to memory. Packets dropped by the Internet protocol (IP) stack, for example, may be reduced by utilizing this copy to memory. An operating system may perform the file write (e.g., commit the mapped view to disk) at a time determined by the operating system.

The systems and methods disclosed herein may use, for example, memory mapped views of a file to write the data to disk rather than standard input/output (I/O) functions. A multicast target node may open a file for mapping and create a memory view of the file to which hundreds or even thousands of incoming data packets can be written. In one configuration, a multicast sending node includes data indicating the capacity of one or more target nodes' current file view. The multicast sending node may thus anticipate when the target nodes will be remapping to a new view of the file. A delay may allow the target nodes to remap their respective file views. That is, intentional delays to limit the use of network bandwidth by the multicast sending node may be synchronized to occur when the target nodes will be remapping to the next view of the file. Additionally or alternatively, a delay may be used to maintain the multicast transmission in a certain bandwidth usage range (e.g., in a network group). Synchronizing a delay with the remap of the file view (e.g., once every thousand packets) may be much more efficient than delaying between each packet on the multicast sending node. Overlapped file input/output (I/O) may also be used in place of file view mapping. However, file view mapping may be simpler to implement than overlapped file input/output.

A computing device that is configured for synchronizing multicast data distribution on a computing device is disclosed. The computing device includes a processor and instructions stored in memory. The computing device reads a first block of data and sends the first block of data via multicast. The computing device also determines whether the first block of data requires a new mapped file view. The determination is based on a capacity of a current mapped file view on a target node. The computing device delays sending a second block of data if the packet in the first block of data requires a new mapped file view.

Delaying sending the second block of data may allow one or more target nodes to map a new mapped file view. Delaying sending a second block of data may include suspending sending the second block of data. Delaying sending a second block of data may include maintaining a network bandwidth usage in a certain range.

The capacity of the current mapped file view may be based on a number of packets. The capacity of the current mapped file view may be determined by measuring past system performance. The past system performance may be measured by a measurement from the group of: a number of retransmission requests, a number of dropped packets and a time used to complete a multicast operation. The computing device may also send a message that specifies the capacity of the current mapped file view for the target node.

The computing device may also receive a message from a target node. The message may specify a processor speed, a memory write speed and a total memory capacity from the target node. The computing device may also determine a capacity of the current mapped file view based on the processor speed, memory write speed and total memory capacity and may send a message to the target node specifying a current mapped file view capacity.

The computing device may also receive the message from a plurality of target nodes; and may determine a delay based on the determined capacity of the current mapped file view and a slowest target node. The slowest target node may be the target node that requires the longest amount of time to map the new mapped file view.

The computing device may also receive a message from a target node requesting a specified delay. Delaying sending the second block of data may be based on the specified delay. Sending the second block of data may be delayed until a message is received from a target node indicating that the target node has finished mapping the new mapped file view.

A method for synchronizing multicast data distribution on a computing device is also disclosed. The method includes reading a first block of data, sending the first block of data via multicast from the computing device and determining whether the first block of data requires a new mapped file view. The determination is based on a capacity of a current mapped file view on a target node. The method also includes delaying sending a second block of data from the computing device if the first block of data requires a new mapped file view.

A computer-readable medium for synchronizing multicast data distribution on a computing device is also disclosed. The computer-readable medium includes instructions for reading a first block of data, sending the first block of data via multicast and determining whether a packet in the first block of data requires a new mapped file view. The determination is based on a capacity of a current mapped file view on a target node. The instructions also include delaying sending a second block of data if the packet in the first block of data requires a new mapped file view.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system where systems and methods for synchronizing multicast data distribution on a computing device may be implemented. A multicast sending node 102 and one or more additional nodes 112 may be connected to a network 110. The multicast sending node 102 and the one or more additional nodes 112 could be implemented as servers, personal computers (PCs) or other kinds of computing devices. The multicast sending node 102 may include a multicast sending module 104 and data 108. The multicast sending module 104 may be a hardware and/or software module used to multicast the data 108 across the network 110 to two or more nodes 112. In one example, the multicast sending node 102 multicasts the data 108 to all of the nodes 112 on the network. In another example, the multicast sending node 102 multicasts the data 108 to certain nodes selected from all of the nodes 112.

The data 108 may be data that is desired to be sent to one or more of the nodes 112 on the network 110. Examples of data 108 include software files (e.g., applications, programs, drivers, etc.) or data (e.g., data files, image files, audio files, video files, etc.). More specifically, the data 108 might be anti-virus definitions for security software, a new word processing program, operating system updates, an image to be used as a desktop background, vulnerability scanning software, inventory scanning software or other applications or data intended for a number of nodes 112.

The multicast sending module 104 may include a synchronizer 106. The synchronizer 106 may be a hardware and/or software module that synchronizes the multicast sending node 102 and the nodes 112 such that multicast packets that are dropped or missed by the nodes 112 as a result of writing data 108 to disk are reduced or eliminated.

Figure 2A:
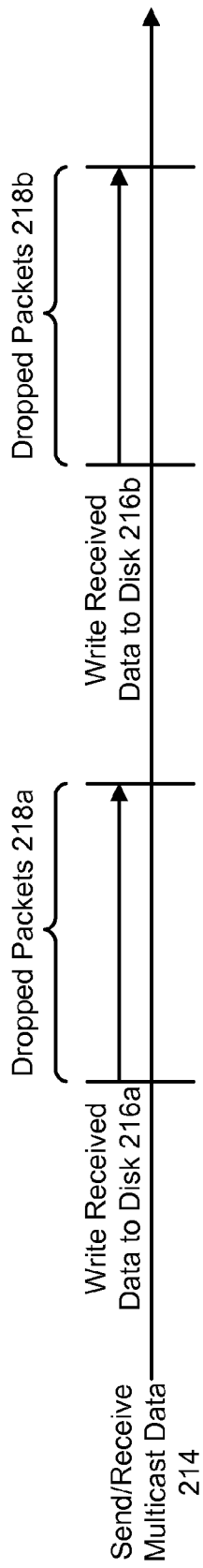
FIG. 2A is a diagram illustrating a timeline for multicasting data.

FIG. 2A is a diagram illustrating a timeline for multicasting data. The lower arrow illustrates that multicast data may be sent and/or received 214 in a continuous fashion during a multicast transmission. Eventually, a node 112 may write data to disk 216a-b that it has received, as illustrated by the upper arrows. While data is being written to disk 216a-b, computing resources such as processing resources may be occupied, such that several packets may be dropped 218a-b. In other words, a node 112 may have difficulty receiving additional data packets while writing received data to disk 216a-b, causing some or even many packets to be dropped 218a-b.

Figure 2B:
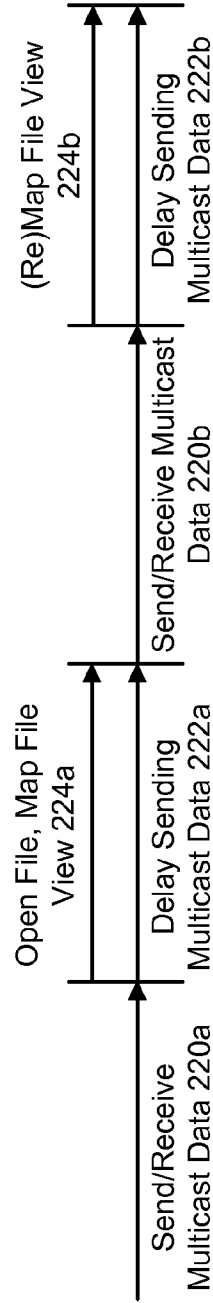
FIG. 2B is a diagram illustrating a timeline for multicasting data according to the systems and methods disclosed herein.

FIG. 2B is a diagram illustrating a timeline for multicasting data according to the systems and methods disclosed herein. The lower arrows represent a procedure for periodically sending and receiving multicast data 220a-b and delaying sending multicast data 222a-b. After an amount of multicast data has been sent and/or received, a multicast sending node 102 may delay sending multicast data 222a-b. During a first delay period 222a, a node 112 may open a file and memory-map a file view to that file 224a. A file view may be a portion of computer memory or virtual memory that is mapped (e.g., byte-to-byte) into a portion of disk space occupied by or reserved for a file. Thus, during the first delay period 222a, a node 112 may open (e.g., make available, reserve) a portion of disk space for a file and map a portion of that disk space to a portion of memory known as a file view 224a. Received data may be copied or mapped into the file view. After the first delay period 222a, the multicast data transmission and reception may resume 220b. After another portion of multicast data has been sent and/or received 220b, another delay in transmission 222b may occur, during which time the file may be remapped to another (e.g., "new") file view 224b.

Figure 3:
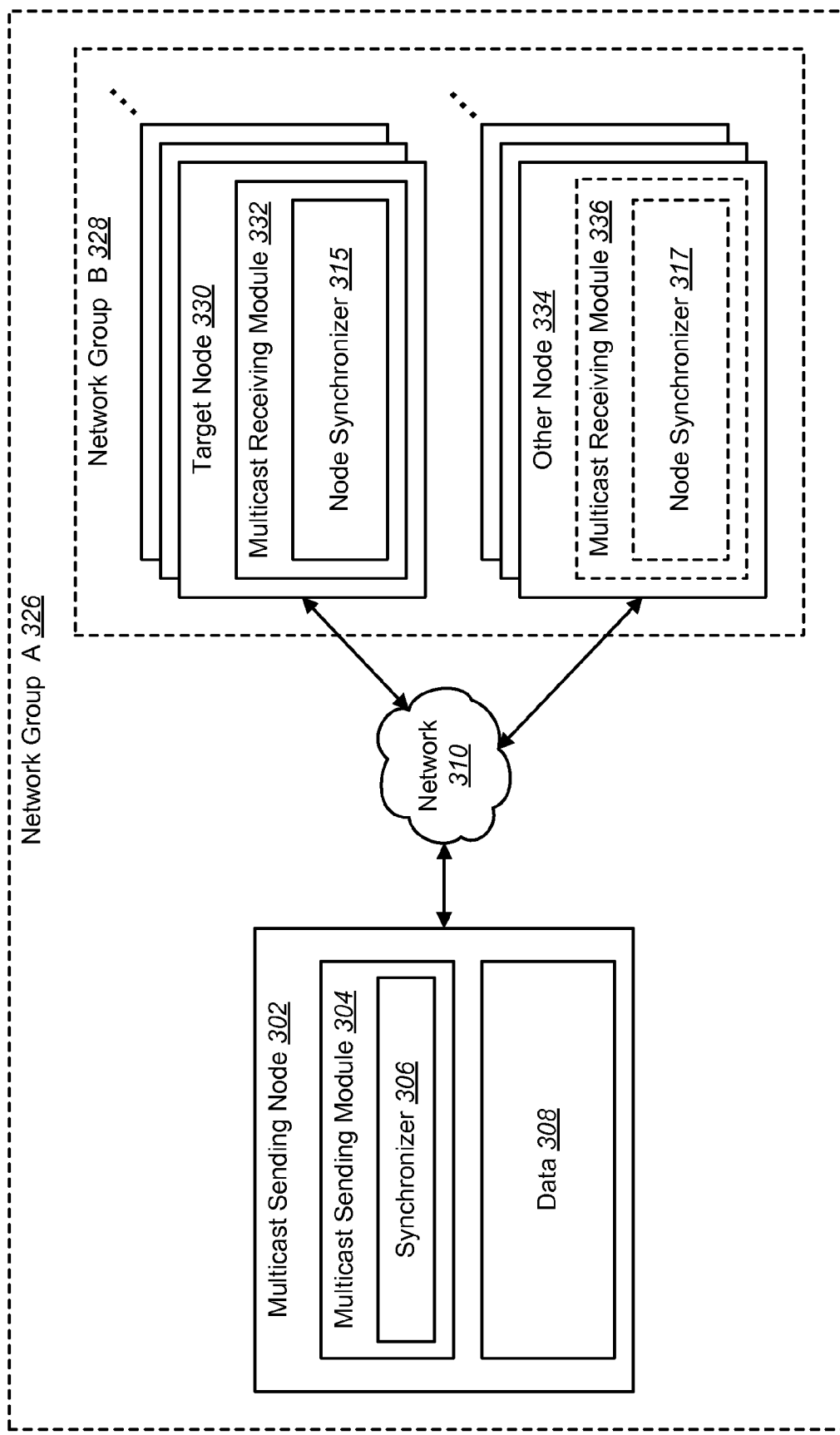
FIG. 3 is a block diagram illustrating configurations of a network in which systems and methods for synchronizing multicast data distribution on a computing device may be implemented.

FIG. 3 is a block diagram illustrating configurations of a network in which systems and methods for synchronizing multicast data distribution on a computing device may be implemented. A multicast sending node 302, one or more target nodes 330 and one or more other nodes 334 may be connected to a network 310. The network 310 may enable the multicast sending node 302, the one or more target nodes 330 and the one or more other nodes 334 to communicate with each other. In one configuration, the multicast sending node 302 is configured to multicast data to the target nodes 330, thereby excluding the other nodes 334 from the transmission. Multicasting could be implemented in several ways. In one configuration, the multicast sending node 302 multicasts data 308 to target nodes 330 identified in a list. The other nodes 334 may not receive any multicast data 308. In another configuration, the multicast sending node 302 may send the data 308 to all of the nodes 330, 334 (i.e., including both target nodes 330 and other nodes 334). In that configuration, the other nodes 334 may disregard any multicast data 308 or packets not intended for them. In yet another configuration, the target nodes 330 may subscribe to certain multicast transmissions, such that multicast data 308 that is sent to a particular address on the network 310 is forwarded to the target nodes 330.

Nodes 302, 330, 334 connected to the network 310 may be grouped according to different configurations. In one configuration, the multicast sending node 302, the target nodes 330 and the other nodes 334 are grouped into a network group A 326. In one example, the network group A 326 is grouped according to a local area network (LAN) or a subset of a larger network. The subset of a larger network may be a subnet, for example. In another configuration, the target nodes 330 and other nodes 334 may be grouped in network group B 328. Network group B 328 may be grouped according to a local area network or subnet, while the multicast sending node 302 is external from network group B 328.

The one or more target nodes 330 may each include a multicast receiving module 332. The one or more target nodes 330 may additionally or alternatively include a node synchronizer 315. The one or more other nodes 334 may or may not include respective multicast receiving modules 336 and/or node synchronizers 317. The multicast receiving modules 332, 336 may be hardware and/or software modules that enable multicast receiving functionality. For example, the multicast receiving modules 332, 336 may determine how multicast data 308 is received and stored. The multicast receiving modules 332, 336 may operate in conjunction with the multicast sending module 304.

The synchronizer 306 included in the multicast sending module 304 and/or the node synchronizer 315 included in the multicast receiving module 332 may be used to determine when the one or more target nodes 330 will remap a file view. In one configuration, the synchronizer 306 included in the multicast sending module 304 schedules multicast data 308 transmissions according to a multicast receiving module 332, 336 configuration (e.g., how data 308 is received and stored). For example, the synchronizer 306 may be used to determine when a remap will occur on the one or more target nodes 330. In another configuration, the one or more node synchronizers 315 may be used to determine when a remap will occur on the one or more target nodes 330. In yet another configuration, the synchronizer 306 and/or the one or more node synchronizers 315 may be used to determine when a remap will occur. For example, the synchronizer 306 and the one or more node synchronizers 315 are used such that both the multicast sending node 302 and the one or more target nodes 330 both have information regarding when the one or more target nodes will remap its file view so that the multicast sending node 302 may delay further transmissions when a sent message will cause a remap.

Figure 4:
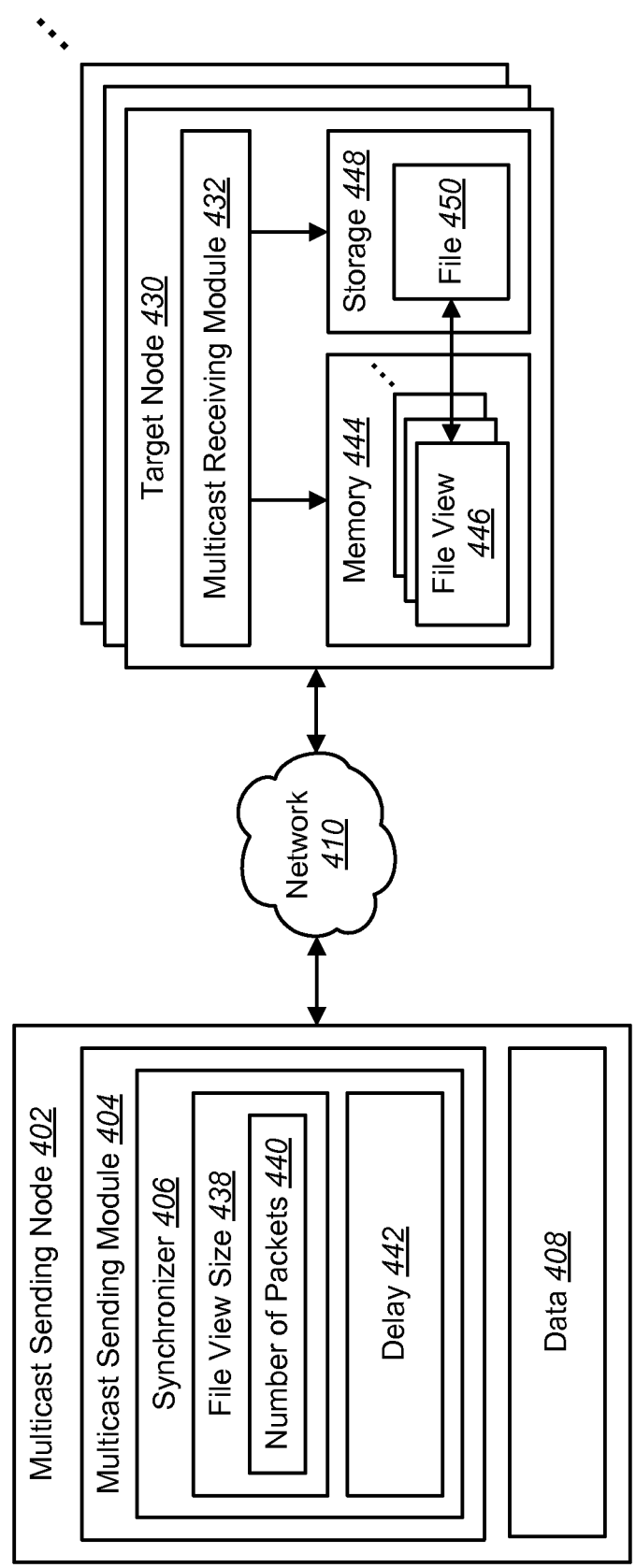
FIG. 4 is a block diagram illustrating another configuration of a system where systems and methods for synchronizing multicast data distribution on a computing device may be implemented.

FIG. 4 is a block diagram illustrating another configuration of a system where systems and methods for synchronizing multicast data distribution on a computing device may be implemented. A multicast sending node 402 may include a multicast sending module 404 and data 408. The multicast sending module 404 may include a synchronizer 406. The multicast sending node 402 is connected to one or more target nodes 430 via a network 410.

The one or more target nodes 430 may each include a multicast receiving module 432, a memory 444 and storage 448. The multicast receiving module 432 may be a hardware and/or software module that includes functions used to manage the reception and storage of the multicast data 408. Memory 444 could be, for example, random access memory (RAM) or some other type of memory. One example of storage 448 is a storage disk or drive.

In one configuration of the systems and methods disclosed herein, one or more memory-mapped file views 446 may be used in the reception and storage of data 408. A "file view" 446 as used herein refers to a portion of computing device memory 444 or virtual memory that is mapped to a portion of computing device storage 448 corresponding to a file or a portion of a file. A file view 446 in memory 444 (e.g., or virtual memory) may be mapped to a file 450 or file portion such that there is a direct byte-to-byte correspondence between the file view 446 allocated in memory 444 and the corresponding file 450 or file portion in storage 448. According to the systems and methods disclosed herein, the one or more file views 446 may generally provide fast read and/or write access to a file 450 in storage 448. In one example, the multicast receiving module 432 writes an amount of data 408 to a memory-mapped file view 446 corresponding to a portion of a file 450 in storage 448. Writing data 408 to a file view 446 may be faster than writing data 408 directly to storage 448, for example. The capacity of one or more file views 446 may be adjustable.

The synchronizer 406 may include a file view size 438. The file view size 438 may reflect the capacity of a file view 446 (e.g., that is currently in use or that will be used next) on the target node 430. For example, the file view size 438 could be specified in terms of a number of bytes. The file view size 438 may additionally or alternatively be expressed as a number of packets 440 that can be stored by the file view 446. For example, given a packet size in bytes and a file view size 438 in bytes, the number of packets 440 that can be stored in the file view 446 can be determined. As the capacity of the one or more file views 446 may be adjustable, the file view size 438 may also be adjustable. When a file view size 438 is changed, the number of packets 440 may be updated to reflect the change. It should also be noted that multicast data 408 packet size (e.g., in bytes) may be adjustable. When the packet size is adjusted, the number of packets 440 may be updated to reflect the adjustment.

The synchronizer 406 may include a delay 442. The delay 442 may be a fixed or changeable amount of time during which the multicast sending node 402 may suspend transmission of multicast data 408 and/or keep the multicast bandwidth usage within a certain range. In one configuration, sending any packets while a target node 430 is remapping a file view 446 may cause them to be dropped. For instance, the delay 442 may be for a minimum amount of time for remapping a file view 446, although the delay 442 may be longer in order to stay within bandwidth limits averaged over a multicast job. The delay 442 is used in order to give the one or more target nodes 430 an amount of time to create and/or map one or more file views 446 during a multicast operation (e.g., without having to receive transmitted packets (e.g., or as many) during the delay 442). For example, after sending a number of packets 440 that fill the file view size 438, the multicast sending node 402 may suspend further data 408 multicasting for the amount of time specified by the delay 442.

Many different approaches may be used to determine and specify the capacity of the one or more file views 446, the file view size 438, the number of packets 440 and the delay 442. Such determinations may be made by the multicast sending node 402, one or more target nodes 430 and/or some other computing device on the network 410. Several example configurations will be given hereafter to illustrate some (i.e., but not all) approaches that may be used. In explaining these configurations, the capacity of the one or more file views 446, the file view size 438, the number of packets (e.g., relating to packet size) 440 and the delay 442 may be referred to as "multicast parameters."

In one configuration, the multicast sending node 402 provides multicast parameters. For example, the multicast sending node 402 may use a fixed capacity for the one or more file views 446, the file view size 438, the number of packets 440 and/or the delay 442 (e.g., fixed multicast parameters). In this case, the multicast sending node 402 may send a message to the one or more target nodes 430 specifying the capacity of the one or more file views 446. The multicast receiving module 432 may use this message to configure its operation to conform to the specified capacity of the file views 446. In other words, the multicast receiving module 432 may configure its operation to create and fill file views 446 at the specified capacity during a multicast operation.

In another configuration, the multicast sending node 402 may determine the multicast parameters heuristically. For example, the multicast sending module 404 records past system performance of varying capacities of the file views 446, file view sizes 438, numbers of packets 440 (e.g., packet size) and delays 442 during multicast operations or tests. The multicast sending module 404 could then select the multicast parameters that yielded the best performance. Performance could be measured by the number of retransmission requests sent to the multicast sending node 402 during and/or after a multicast operation, for example. In another example, performance could be measured by requesting a report of numbers of dropped or missed packets from the target nodes 430. Yet another way to measure performance could be the amount of time taken to finish the multicast operation. The multicast parameters that yielded the smallest number of retransmission requests, the lowest number of dropped packets and/or that required the smallest amount of time to successfully complete the multicast operation could be selected for future multicast operations. Once selected, the multicast sending node 402 may send a message to the one or more target nodes 430 specifying the capacity of the file views 446.

In yet another configuration, the multicast sending node 402 may determine the multicast parameters by polling one or more target nodes 430. In this example, the multicast sending node 402 requests certain information from one or more target nodes 430. For instance, the multicast sending node 402 could poll the target nodes for processor speed, memory 444 write speed and total memory 444 capacity. Based on this information, the multicast sending module 404 could assign a file view 446 capacity (e.g., and hence, file view size 438) and calculate an amount of delay 442 needed for the target node 430 to create and map the file views 446. Additionally, the multicast sending module 404 may take many target nodes 430 into account. For example, the multicast sending module 404 might determine the delay based on the slowest processor and memory 444 of a target node 430 on the network 410. That is, the multicast sending module 404 could set the delay 408 long enough to accommodate the slowest target node 430 on the network 410. However, in the case where one or a few target nodes 430 would significantly slow the multicast operation through this accommodation, the multicast sending module 404 might exclude such nodes during the initial multicast operation, possibly multicasting to the "slow" nodes at a later time.

In yet another configuration, the delay 442 could be changed during the multicast operation. For example, the multicast sending node 402 could send the number of packets 440 to fill the file view 446, and then delay until every target node 430 has reported that it has finished mapping a new file view 446. As can be seen from these example configurations, many approaches may be used to determine multicast parameters. The systems and methods disclosed herein could even use a hybrid of the approaches discussed above.

In yet another configuration, the multicast sending node 402 and the one or more target nodes 430 may use a predetermined file view size 438 and a predetermined delay 442 value. For example, assuming that the file view size is 1 megabyte (MB), the multicast sending node 402 may send a packet that straddles the boundary of the file view 438. For example, the packet may have 100 bytes beyond a 1 MB file view 446 size. When this occurs, the one or more target nodes 430 remap the file view 446 such that the 100 bytes is written in the next 1 MB file view 446. The multicast sending node 402 includes the file view size 438 and thus "knows" the file view size 438 that the one or more target nodes 430 are using. The multicast sending node 402 may thus use a delay 442 that is a fixed amount of time.

Figure 5:
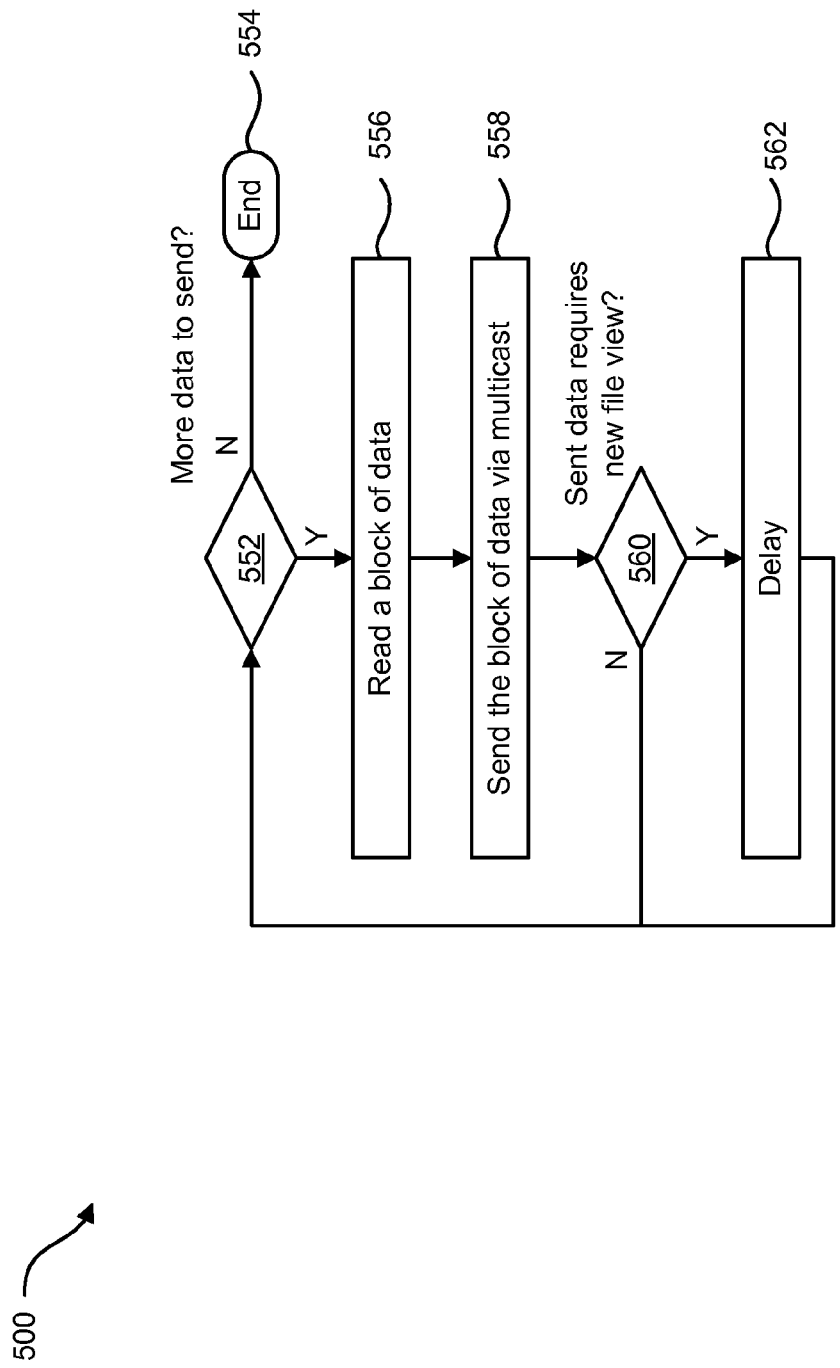
FIG. 5 is a flow diagram illustrating one configuration of a method for synchronizing multicast data distribution on a computing device or multicast sending node.

FIG. 5 is a flow diagram illustrating one configuration of a method 500 for synchronizing multicast data distribution on a computing device or multicast sending node 102. A multicast sending node 102 may determine 552 whether there is more data 108 to send. For example, the multicast sending node 102 determines whether it has multicast or sent all of the data 108 to the target nodes 330. If all of the data 108 has been sent, operation may end 554. If not all of the data 108 has been sent, the multicast sending node 102 may read 556 a block of data. A block of data may be, for example, a certain number of bytes or a packet of the multicast data 108. A block of data may or may not correspond to an entire file view 446 or an evenly divisible portion of a file view 446. The block of data may be read 556 from a local source (e.g., disk, optical drive, etc.) or a remote source (e.g., server) into a local memory or cache, for example.

The multicast sending node 102 may send 558 the block of data via multicast. For example, the multicast sending node 102 sends 558 the block of data or a packet to all of the target nodes 330. The multicast sending node 102 may then determine 560 whether the packet or block of data requires a new file view 446. This determination 560 may be based on whether the current file view 446 can hold all of the data included in the block of data or packet (e.g., without exceeding the current file view 446 capacity). For example, if the current file view 446 does not have enough remaining capacity to hold all of the sent block of data or packet, the multicast sending node may determine 560 that the block of data or packet requires a new file view 446 in order to be fully written. For instance, if the current file view size is 1 MB with 999 kilobytes (KB) already written and the block of data or packet is 1.3 KB, a new file view 446 is required to write the block of data or packet in its entirety. In this case, 1 KB would be written to the current file view 446 and the remaining 300 bytes would be written to the new file view 446.

In another configuration, the multicast sending node 102 determines whether the number of packets that has been sent (i.e., to be input into the current file view 446) exceeds the number of packets 440 that would fill the current file view size 438. This determination 560 may take into account the number of packets or blocks of data that have been sent 558 earlier. If the most recently sent data does not include a packet that exceeds the number of packets 440 that would fill the current file view size 438, then the multicasting sending node 102 may return to determine 552 whether there is more data to send.

If the most recently sent packet or data block includes enough data to exceed the capacity of the current file view 446 and/or a number of packets 440 that would exceed the current file view size 438, then the multicast sending node 102 may delay 562 sending additional data 108. For example, the multicast sending node 102 may suspend sending additional data during the delay 442. As discussed above, the delay 442 is used to give the target nodes 330 the time needed to create and map a new file view 446. Alternatively, the multicast sending node 102 may delay (e.g., slow down) 562 the transmission of multicast data 108 such that bandwidth usage on a network group 326, 328 remains in a certain range until a new file view 446 is mapped or according to bandwidth usage averaged over a multicast job. Delaying 562 the transmission of multicast data 108 may thus alleviate the resource demands on the target nodes 330 (e.g. to receive multicast data 108 or to receive the data at the same speed) while attempting to map a file view 446. As was discussed above, the delay 442 may be determined in several different ways. After the delay 442, the multicast sending node 102 may return to determine 552 whether there is more data to send.

In one configuration, a block of data or packet size is 1418 bytes. This block size may be based on a Maximum Transmission Unit (MTU). For example, if a large amount of data is sent (e.g., 1 MB in a single send) network devices may break it up into Transmission Units (e.g., blocks of data in a size they can deal with) as it gets passed along the network 110. A largest possible packet or block size that will not need to be broken up into smaller blocks by any of the network devices (routers, switches, etc.) may be used. One reason for this is that when a User Datagram Protocol ("connection-less") packet is sent that needs to be broken up, an entire group of blocks may be discarded if any of the smaller blocks are lost. The transmission may not be retried when UDP is used, which may be inefficient.

In one configuration, data messages have some header information such as a GUID (Globally Unique Identifier (e.g., a job or file identifier)) and some other information. In this configuration, the size of the actual data that can be put in a data message (while leaving room for the header, for example) is 1418 bytes. A predetermined file view 446 size may be 1 MB (e.g., 1024×1024 bytes). Thus, a file may be read 556 (or obtained from a network 110 source) 1418 bytes of data at a time. The block of data may then be sent 558 via multicast. For example, the block of data may be sent in one or more packets. The multicast sending node 102 may determine that the 1418 bytes that were sent will push the data over the 1 MB boundary. When this occurs, the multicast sending node 102 may delay 562 in order to allow the one or more target nodes 330 to remap the file view 446. The file view may be larger (e.g., have a larger capacity) than the amount of data sent in one packet.

In another configuration and for purposes of illustration, assume that a 1 gigabyte (GB) data 108 file is desired to be multicast from the multicast sending node 102 to the target nodes 330. Further assume that a file view size 438 is 10 megabytes (MB), the packet size and/or block size is 10 kilobytes (KB). Thus, the 1 GB file 450 can be mapped with 100 file views 446. Additionally, the 10 MB file view 446 could hold 1,000 packets or blocks of data 108. Thus, 1,000 would be the number of packets or blocks 440 needed to fill the file view 446. As illustrated in FIG. 5, the multicast sending node 102 (e.g., the multicast sending module 104) would determine 560 that no packet in the first 1000 packets or blocks of data requires a new file view 446. That is, all of the packets or data blocks up to and including the 1000$^{th}$ packet or data block did not include more than 1,000 packets, which equals the current file view size 438. When the 1000 packet or block of data 108 is sent, the multicast sending node 102 determines 560 that the 1,001$^{st}$ packet requires a new file view 446. At that point, the multicast sending node 102 delays 562 sending more data, which gives the target nodes 330 enough time to map a new file view 446. The sent multicast data 108 that exceeds the current file view size 438 may be held in a buffer on the target nodes 330 until a new file view 446 is created and mapped.

The multicast sending node 102 and the one or more target nodes 330 may alternatively be configured regarding how to determine 560 whether a new file view 446 is required and how to delay 562. In one configuration, the multicast sending node 102 may determine 560 that a new file view 446 is required when a packet is sent that (e.g., in addition with other packets) exceeds the number of packets 440 that fills the file view size 438. That is, the last packet to be added to a file view 446 may "require" that an additional file view 446 be created and mapped (e.g., if there is more data 108 to be sent/received). The target nodes 330 may be compatibly configured such that an additional file view 446 will be created when a packet is received that exceeds the number of packets 440 that fills a file view 446.

In another alternative configuration, the multicast sending node 102 sends packets of data 108 until one or more target nodes 330 send a message requesting a delay 442 (e.g., because the current file view 446 is full) in order to map a new file view 446. In one configuration, the multicast sending node 102 may have a predetermined delay 442 that may be used to delay 562 additional data 108 transmissions. In another configuration, the delay 442 request message may request a certain amount of delay 442 (e.g., needed to create and map a new file view 446). The multicast sending node 102 could resume sending 558 additional data 108 when this requested delay 442 had expired. In yet another configuration, the multicast sending node 102 may simply delay 562 additional data 108 transmissions indefinitely until one or more target nodes 330 send a message to the multicast sending node 102 indicating that they are ready for additional multicast data 108 transmissions.

Figure 6:
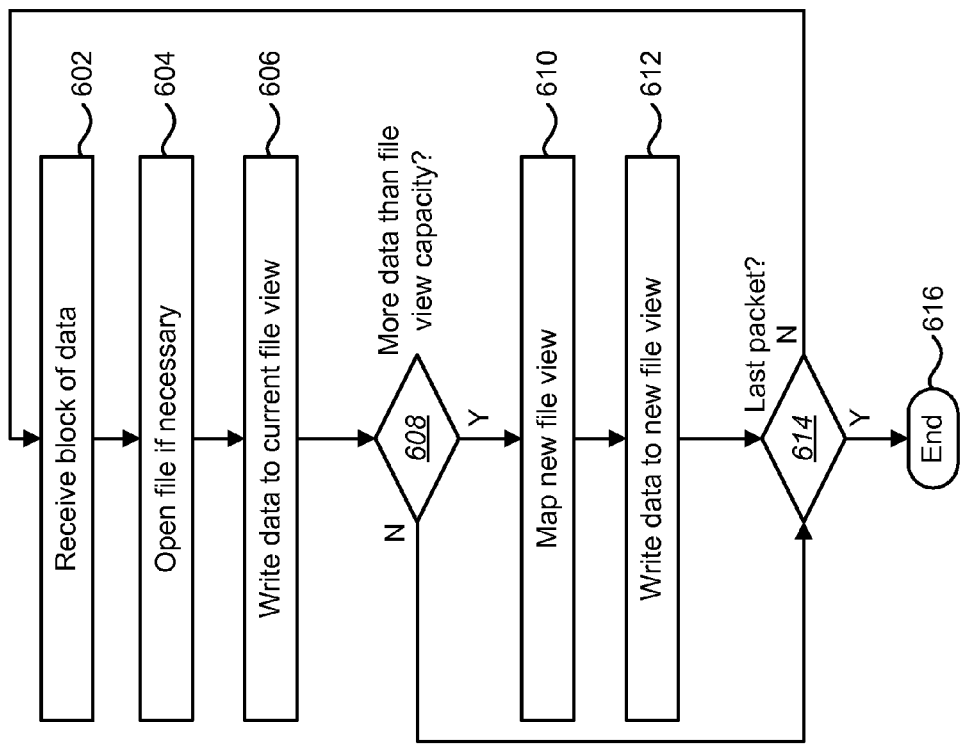
FIG. 6 is a flow diagram illustrating another configuration of a method for synchronizing multicast data distribution on a computing device or target node.

FIG. 6 is a flow diagram illustrating another configuration of a method 600 for synchronizing multicast data distribution on a computing device or target node 330. A target node 330 may receive 602 a block of data 108. In one configuration, the received 602 block of data or packet is temporarily held in a buffer. The target node 330 may open 604 a file if necessary. For example, the target node 330 opens 604 a file by allocating an amount of storage 448 space for the file that is currently being received 602. However, the target node 330 may only open 604 a file if necessary. That is, if storage 448 space has already been allocated for the file being received 602, then the target node 330 will not "open" 604 or allocate the storage 448 space again.

The target node 330 may write 606 data to a current file view 446. For example, the target node 330 may write 606 all of the data from the block or packet of data that will fit within the capacity of the current file view 446. For example, if the packet size is 1.3 KB and the current file view 446 with a capacity of 1 MB already has 999 KB written to it, the target node 330 may write 1K bytes to the current file view 446. In one configuration, if a current file view has not yet been initialized and/or mapped, no data may be written 606, since no current file view is available for use.

The target node 330 may determine 608 whether there is (additional) data in the received block of data or packet than can be written to the current file view. For example, the target node 330 may determine 608 whether the (remaining) capacity of the current file view 446 is large enough to write all of the (additional) received data block or packet, or whether more data will remain after writing the current file view to capacity. Continuing with the above example, if the current file view 446 has a capacity of 1 MB and already has 999 KB occupied when a block of 1.3 KB is received, the first 1 KB will be written to the current file view 446 with 300 bytes remaining. In this case, the target node 330 determines that there is more data (e.g., more additional data) received than will fit in the current file view's 446 (remaining) capacity. In other words, the determination 608 may indicate whether data remains to be written after the current file view 446 has been filled or written to its capacity.

If there is not more data than the (remaining) file view 446 capacity (e.g., all of the currently received data can be written to the current file view without any data remaining to be written), the target node 330 may determine 614 whether the data received (and written, for example) is the last packet or block of data. The last packet or block of data may be, for example, the last packet of multicast data 108 for the file 450. If the received data is the last packet or block of data, operation may end 616. However, if the received (and written) data is not the last packet or block of data, the target node 330 may receive 602 an additional packet or block of data 108.

If the target node 330 determines 608 that there is more data than file view capacity (e.g., not all of the received packet or block of data can be written to the current file view 446), the target node 330 may map 610 a new file view. For example, the target node 330 creates and maps 610 a new file view 446 for the additional received 602 packet or block of data. In one configuration, the target node 330 creates a new file view 446 and maps 610 it 446 to a (e.g., next) portion of the file 450 in storage 448. The mapping 610 may be done on an address-to-address or byte-to-byte basis, for example. Thus, each address or byte of data in the file view 446 may directly correspond to an address or byte of data of the file 450 in storage 448. During mapping 610, the multicast sending node 402 may delay 562 sending more data, for example.

The target node 330 may write 612 the data to the new file view 446. For example, if there is data remaining to be written that was not written to the current file view 446, then that data may be written 612 to the new file view 612. The target node 330 may determine 614 whether the received 602 (and written) data is the last packet or block of data (e.g., of the data 108 for transfer). For example, the target node 330 may have (received) information regarding the amount of data (e.g., the file size) that was supposed to be transferred. If the currently received data is the last of the data 108 to be transferred, operation may end 616. If it is not the last of the data 108 to be transferred (e.g., multicast data 108), operation may return to receive 602 another packet or block of data.

Figure 7:
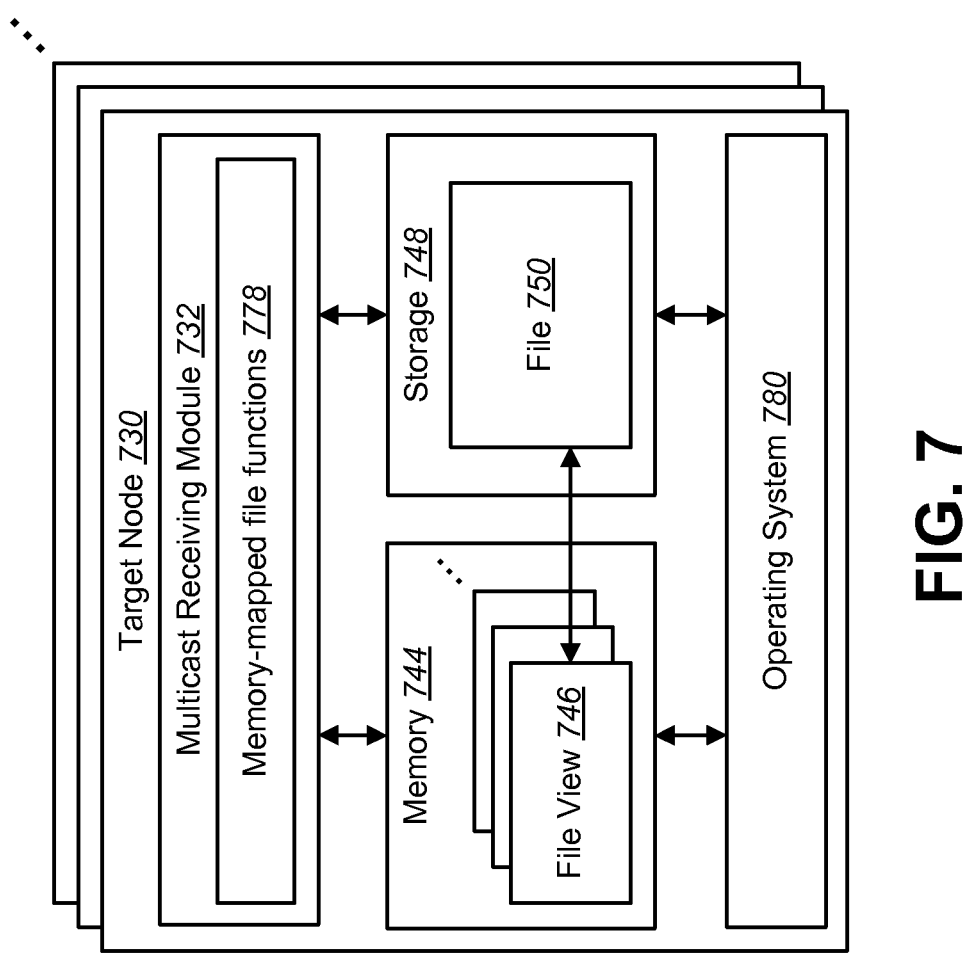
FIG. 7 is a block diagram illustrating one configuration of one or more target nodes in which systems and methods for synchronizing multicast data distribution may be implemented.

FIG. 7 is a block diagram illustrating one configuration of one or more target nodes 730 in which systems and methods for synchronizing multicast data distribution may be implemented. One or more target nodes 730 may include a multicast receiving module 732, memory 744, storage 748 and an operating system 780. The multicast receiving module 732 may include memory-mapped file functions 778. These functions 778 allow the multicast receiving module 732 to create and write to one or more memory-mapped file views 746 in memory 744. The memory-mapped file views 746 directly correspond to storage 748 space allocated for a file 750. Each memory-mapped file view 746 may be mapped to a different portion of the file 750 (e.g., different addresses, byte ranges, etc.).

While the multicast receiving module 732 may write to the one or more file views 746, the operating system 780 may manage moving the data written to the file views 746 into actual storage 748. In one configuration, the operating system 780 copies or moves data from the file views 746 to the file 750 in storage 748 when the target node 730 is not busy with other tasks (e.g., when processing resources are not busy). Alternatively or in addition, the operating system 780 may move or copy data written to the file views 746 when the memory 744 has reached a certain saturation point (e.g., a certain amount of data is occupying the memory 744). Furthermore, file view 746 data may be moved or copied when certain file view 746 data in the memory 744 has not been used for a certain amount of time or is not needed for current or future processes. In other configurations, the data in the file view(s) 746 may be moved at other times. (e.g., after all of the data 108 has been received, etc.).

Figure 8:
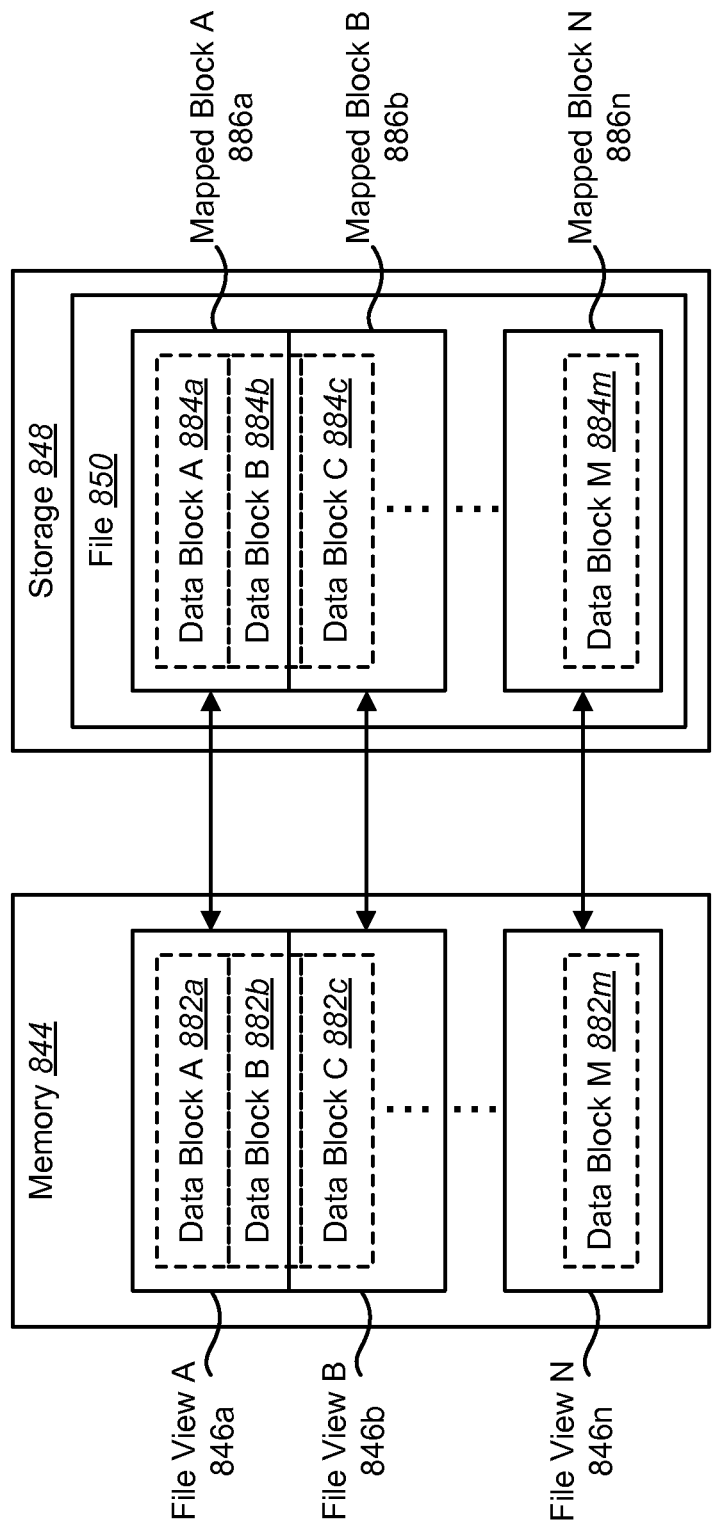
FIG. 8 is a block diagram illustrating one configuration of memory and storage in which memory-mapped file views may be implemented.

FIG. 8 is a block diagram illustrating one configuration of memory 844 and storage 848 in which memory-mapped file views 846 may be implemented. The memory 844 may include one or more memory-mapped file views 846a-n. The storage 848 may include a file 850. Each file view 846a-n may correspond to a mapped block 886a-n of storage 848 space in the file 850. For example, a file view A 846a may be mapped to a mapped block A 886a and so on. In one configuration, each byte or address included in the file views 846a-n is mapped to a corresponding byte or address in the mapped blocks 886a-n. Although FIG. 8 illustrates several file views 846 corresponding to several mapped blocks 886, a single file view 846 could correspond to a single mapped block 886, which may map or occupy all of the storage 848 space allocated for the file 850.

FIG. 8 also illustrates several data blocks 882 included in the file views 846 corresponding to data blocks 884 included in the mapped blocks 886. The data blocks 882a-m, 884a-m may be data blocks sent 558 from the multicast sending node 102. The data blocks 882, 884 may "fit" evenly within the file views 846 and/or mapped blocks 886, or may "straddle" the file views 846 and mapped blocks 886. For example, data block B 882b may be partially written to the file view A 846a and partially written to file view B 846b (and hence, partially stored in each of mapped block A 886a and mapped block B 886b). For example, when data block B 882b is sent from the multicast sending node 102 and received by the targeted nodes 330, the multicast sending node may delay 562 sending more data such that the targeted nodes 330 may create and map a file view B 846b, and such that the data block B 882b can be written to file view A 846a and file view B 846b. The operating system 780 may eventually move the data blocks 882a-m written to the file views 846a-n to the mapped blocks 886a-n included in the file 850 in storage 848.

Figure 9:
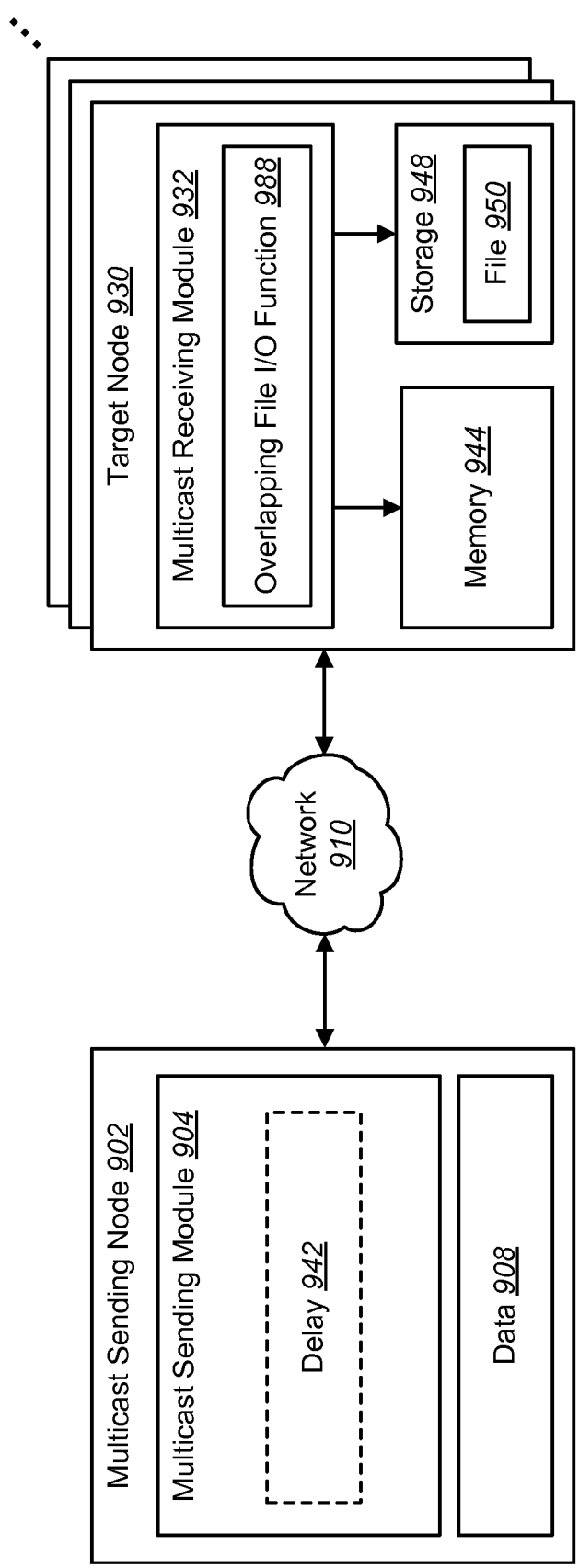
FIG. 9 is a block diagram illustrating another configuration of a system in which systems and methods for synchronizing multicast data distribution may be implemented.

FIG. 9 is a block diagram illustrating another configuration of a system in which systems and methods for synchronizing multicast data distribution may be implemented. A multicast sending node 902 and one or more target nodes 930 may be connected to and communicate via a network 910. The multicast sending node 902 may be tasked with multicasting data 908 to the target nodes 930. A multicast sending module 904 on the multicast sending node 902 may include an optional delay 942.

The one or more target nodes 930 may each include a multicast receiving module 932, memory 944 and storage 948. In this configuration, the multicast receiving module 932 may include overlapping file input/output (I/O) functions 988. In this context, the overlapping file I/O functions 988 may permit a programmatic thread to write data 908 to a file 950 in storage 948 in the "background." For example, assume that a programmatic thread running on a target node 930 is tasked with receiving data 908 into memory 944 and writing that data 908 to the file 950 in storage 948. Overlapping file I/O functions 988 permit such a thread to perform file 950 write operations asynchronously. More specifically, the programmatic thread may begin a file 950 write operation and return to receive data into memory 944 without the file 950 write operation being completed first. In this way, the file 950 may be written in the "background" (e.g., when the target node 930 is not busy performing other tasks). An operating system (not shown) on each target node 930 may determine when the thread may write the file 950 to storage 948.

The delay 942 may be used, depending on the amount of data 908 (e.g., the file size) that is to be multicast over the network 910 and the amount of available memory 944 on the target node(s). For example, if the amount of multicast data 908 is greater than the amount of available memory 944 on the target node 930, a periodic delay 942 may be used in order to give the target node 930 (e.g., the programmatic thread) an opportunity to write an amount of data 908 to the file 950 in storage 948 before the memory 944 is saturated (e.g., "full"). For example, if the target node 930 is not given some time to write the data 908 to storage 948 before the memory 944 is saturated, the thread may be forced to write the data 908 to the file 950 while more multicast data 908 is being received, possibly causing packets to be dropped. The delay 942 could be specified by a user of the multicast sending node 902, for example. In another example, the delay 942 could be calculated based on the multicast data rate, the processing speed, memory 944 write speed and/or storage 948 write speed on each target node 930. This calculation may be performed by the multicast sending node 902 and/or the target node(s) 930.

Figure 10:
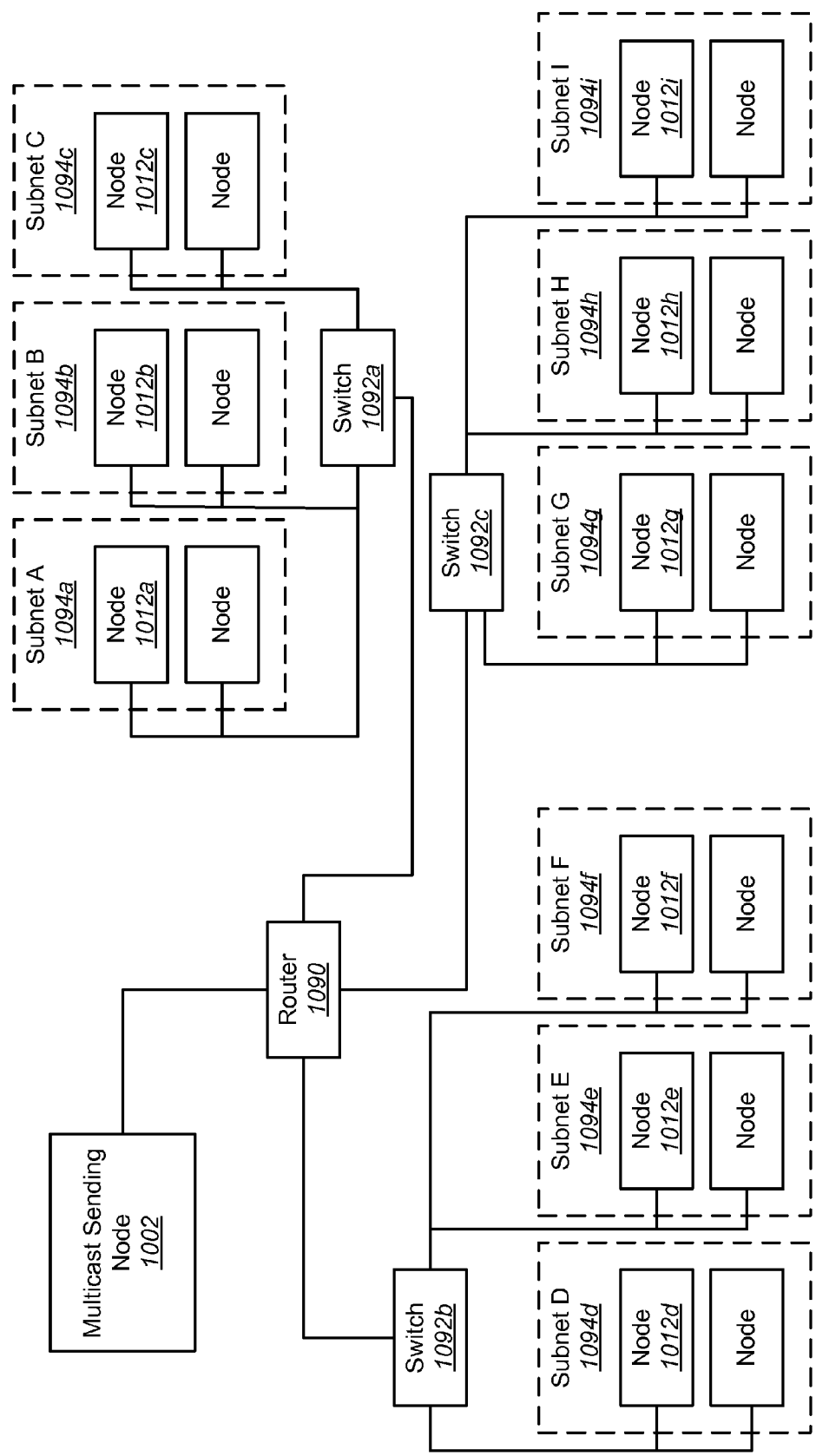
FIG. 10 is a block diagram that illustrates one configuration of a network where a system for synchronizing multicast data distribution on a computing device may be implemented.

FIG. 10 is a block diagram that illustrates one configuration of a network where a system for synchronizing multicast data distribution on a computing device may be implemented. A multicast sending node 1002 is connected to a router 1090. The router 1090 is connected to switches 1092a, 1092b, 1092c. The switch 1092a is connected to several nodes 1012a, 1012b, 1012c, etc. via their respective subnets 1094a, 1094b, 1094c. The switch 1092b is connected to several nodes 1012d, 1012e, 1012f, etc. via their respective subnets 1094d, 1094e, 1094f. The switch 1092c is connected to several nodes 1012g, 1012h, 1012i, etc. via their respective subnets 1094g, 1094h, 1094i. The nodes 1012 may be, for example, target nodes 330 and/or other nodes 334. Although FIG. 10 only shows one router 1090 and a limited number of switches 1092, subnets 1094 and nodes 1012, many and varied numbers of routers 1090, switches 1092, subnets 1094 and nodes 1012 may be included in networks and/or systems, where a system for synchronizing multicast data distribution on a computing device may be implemented.

Figure 11:
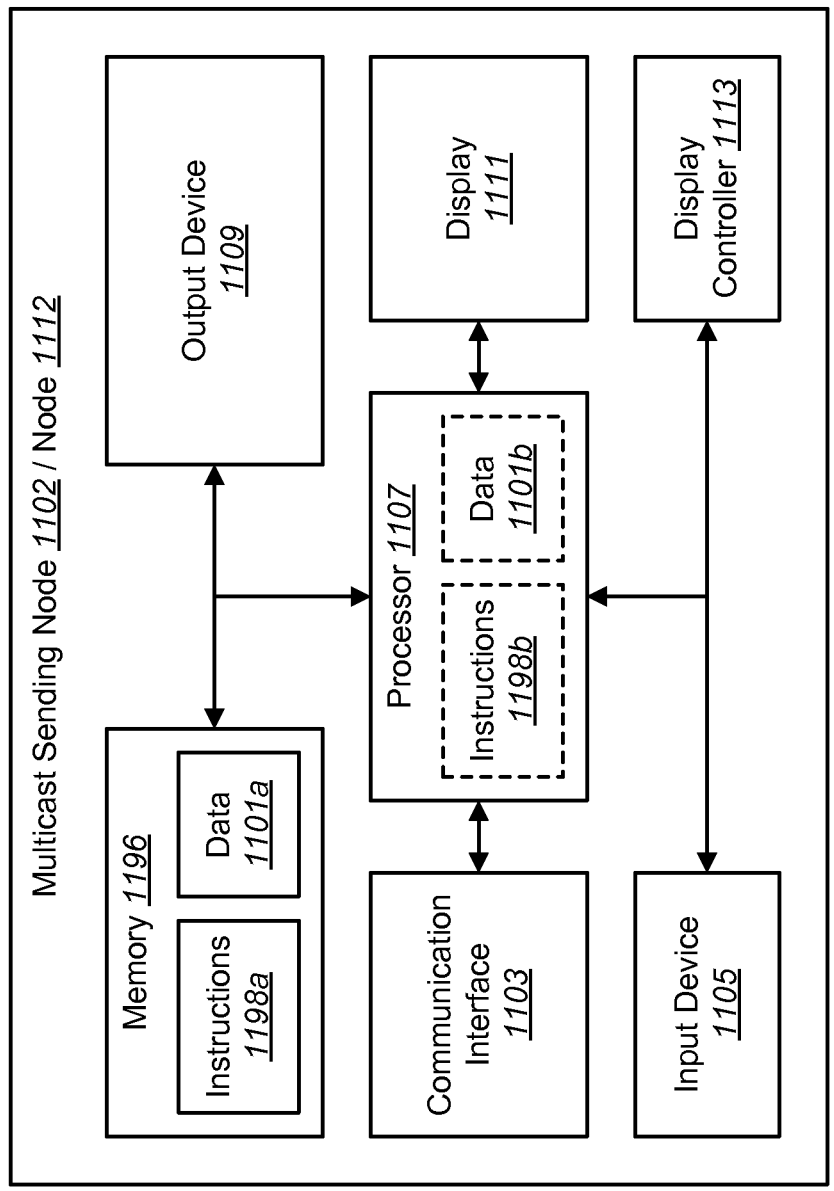
FIG. 11 illustrates various components that may be utilized in a multicast sending node and/or node.

FIG. 11 illustrates various components that may be utilized in a multicast sending node 1102 and/or node 1112. The illustrated components may be located within the same physical structure or in separate housings or structures. It should be noted that a node 1112 may be a target node 330, 930 or another node 334.

The multicast sending node 1102 and/or node 1112 may include a processor 1107 and memory 1196. The memory 1196 may include instructions 1198a and data 1101a. The processor 1107 controls the operation of the multicast sending node 1102 and/or node 1112 and may be, for example, a microprocessor, a microcontroller, a digital signal processor (DSP) or other device known in the art. The processor 1107 typically performs logical and arithmetic operations based on program instructions 1198b and/or data 1101b it loads from the memory 1196.

The multicast sending node 1102 and/or node 1112 typically may include one or more communication interfaces 1103 for communicating with other electronic devices. The communication interfaces 1103 may be based on wired communication technology, wireless communication technology or both. Examples of different types of communication interfaces 1103 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The multicast sending node 1102 and/or node 1112 typically may include one or more input devices 1105 and one or more output devices 1109. Examples of different kinds of input devices 1105 include a keyboard, mouse, microphone, remote control device, button, joystick, trackball, touchpad, lightpen, etc. Examples of different kinds of output devices 1109 include a speaker, printer, etc. One specific type of output device which may be typically included in a computer system is a display device 1111. Display devices 1111 used with configurations disclosed herein may utilize any suitable image projection technology, such as a cathode ray tube (CRT), liquid crystal display (LCD), light-emitting diode (LED), gas plasma, electroluminescence or the like. A display controller 1113 may also be provided, for converting data stored in the memory 1196 into text, graphics, and/or moving images (as appropriate) shown on the display device 1111.

Of course, FIG. 11 illustrates only one possible configuration of a multicast sending node 1102 and/or node 1112. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device that is configured for synchronizing multicast data distribution, comprising:
    a processor;
    memory in electronic communication with the processor;
    instructions stored in the memory, the instructions being executable to:
    read a first block of data;
    send the first block of data via multicast, wherein the first block of data comprises software files for an application or program;
    send a message to a target node that specifies a capacity of a current mapped file view for the target node, wherein the current mapped file view comprises a first portion of the memory that is mapped to a first portion of computing device storage corresponding to a first portion of a file, wherein the file is one of the software files;
    determine whether the first block of data requires a new mapped file view by determining the difference between the capacity of the current mapped file view sent in the message and the size of the first block of data, wherein the new mapped file view is required when the size of the first block of data exceeds the capacity of the current mapped file view, and wherein the new mapped file view comprises a second portion of the memory that is mapped to a second portion of computing device storage corresponding to a second portion of the file, wherein the file is one of the software files; and
    delay sending a second block of data based on whether the first block of data requires a new mapped file view.

2. The computing device of claim 1, wherein delaying sending the second block of data allows one or more target nodes to map a new mapped file view.

3. The computing device of claim 1, wherein delaying sending a second block of data comprises suspending sending the second block of data.

4. The computing device of claim 1, wherein delaying sending a second block of data comprises maintaining a network bandwidth usage in a certain range.

5. The computing device of claim 1, wherein the capacity of the current mapped file view is based on a number of packets.

6. The computing device of claim 1, wherein the capacity of the current mapped file view is determined by measuring past system performance.

7. The computing device of claim 6, wherein the past system performance is measured by a measurement selected from the group consisting of: a number of retransmission requests, a number of dropped packets and a time used to complete a multicast operation.

8. The computing device of claim 1, wherein the instructions are further executable to:
receive a message from a target node, wherein the message specifies a processor speed, a memory write speed and a total memory capacity from the target node; and
determine the capacity of the current mapped file view based on the processor speed, memory write speed and total memory capacity.

9. The computing device of claim 8, wherein the instructions are further executable to:
receive the message from a plurality of target nodes; and
determine a delay based on the determined capacity of the current mapped file view and a slowest target node, wherein the slowest target node is the target node that requires the longest amount of time to map the new mapped file view.

10. The computing device of claim 1, wherein the instructions are further executable to receive a message from a target node requesting a specified delay and wherein delaying sending the second block of data is based on the specified delay.

11. The computing device of claim 1, wherein sending the second block of data is delayed until a message is received from a target node indicating that the target node has finished mapping the new mapped file view.

12. A method for synchronizing multicast data distribution on a computing device, comprising:
reading a first block of data;
sending the first block of data via multicast from the computing device, wherein the first block of data comprises software files for an application or program;
sending a message to a target node that specifies a capacity of a current mapped file view for the target node, wherein the current mapped file view comprises a first portion of the memory that is mapped to a first portion of computing device storage corresponding to a first portion of a file, wherein the file is one of the software files;
determining, on the computing device, whether the first block of data requires a new mapped file view, by determining the difference between the capacity of the current mapped file view sent in the message and the size of the first block of data, wherein the new mapped file view is required when the size of the first block of data exceeds the capacity of the current mapped file view, and wherein the new mapped file view comprises a second portion of a memory that is mapped to a second portion of computing device storage corresponding to a second portion of the file, wherein the file is one of the software files; and
delaying sending a second block of data from the computing device based on whether the first block of data requires a new mapped file view.

13. The method of claim 12, wherein delaying sending the second block of data allows one or more target nodes to map a new mapped file view.

14. The method of claim 12, wherein delaying sending a second block of data comprises suspending sending the second block of data.

15. The method of claim 12, wherein delaying sending a second block of data comprises maintaining a network bandwidth usage in a certain range.

16. The method of claim 12, wherein the capacity of the current mapped file view is based on a number of packets.

17. The method of claim 12, wherein the capacity of the current mapped file view is determined by measuring past system performance.

18. The method of claim 17, wherein the past system performance is measured by a measurement selected from the group consisting of: a number of retransmission requests, a number of dropped packets and a time used to complete a multicast operation.

19. The method of claim 12, further comprising:
receiving a message from a target node, wherein the message specifies a processor speed, a memory write speed and a total memory capacity from the target node; and
determining the capacity of the current mapped file view based on the processor speed, memory write speed and total memory capacity.

20. The method of claim 19, further comprising:
receiving the message from a plurality of target nodes; and
determining a delay based on the determined capacity of the current mapped file view and a slowest target node, wherein the slowest target node is the target node that requires the longest amount of time to map the new mapped file view.

21. The method of claim 12, further comprising receiving a message from a target node requesting a specified delay and wherein delaying sending the second block of data is based on the specified delay.

22. The method of claim 12, wherein sending the second block of data is delayed until the computing device receives a message from a target node indicating that the target node has finished mapping the new mapped file view.

23. A non-transitory computer-readable medium for synchronizing multicast data distribution on a computing device comprising executable instructions for:
reading a first block of data;
sending the first block of data via multicast, wherein the first block of data comprises software files for an application or program;
sending a message to a target node that specifies a capacity of a current mapped file view for the target node, wherein the current mapped file view comprises a first portion of the memory that is mapped to a first portion of computing device storage corresponding to a first portion of a file, wherein the file is one of the software files;
determining whether the first block of data requires a new mapped file view, by determining the difference between the capacity of the current mapped file view sent in the message and the size of the first block of data, wherein the new mapped file view is required when the size of the first block of data exceeds the capacity of the current mapped file view, and wherein the new mapped file view comprises a second portion of a memory that is mapped to a second portion of computing device storage corresponding to a second portion of the file, wherein the file is one of the software files; and delaying sending a second block of data based on whether the first block of data requires a new mapped file view.

* * * * *